UNITED STATES PATENT OFFICE.

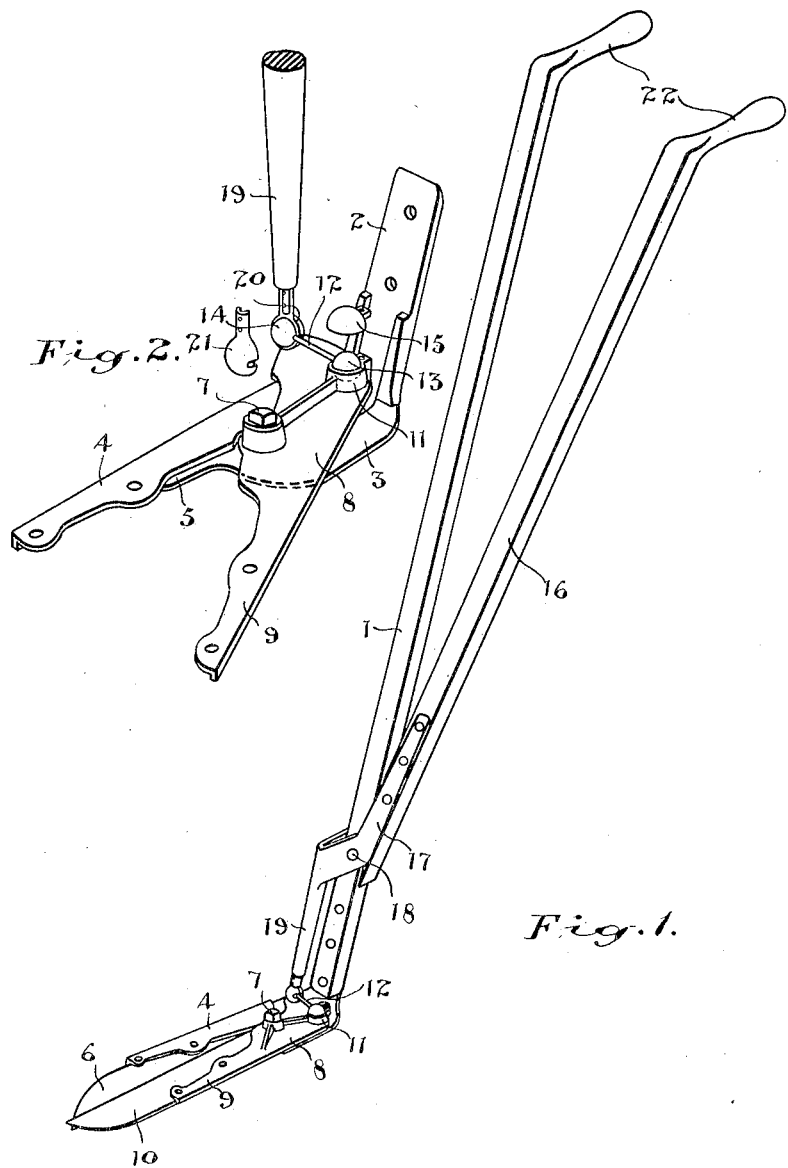

CALEB ROACH, OF TORONTO, ONTARIO, CANADA.

SHEARS.

1,373,638.

Specification of Letters Patent.

Patented Apr. 5, 1921.

Application filed October 21, 1918. Serial No. 259,041.

*To all whom it may concern:*

Be it known that I, CALEB ROACH, a subject of the King of Great Britain, and resident of the city of Toronto, county of York, Province of Ontario, in the Dominion of Canada, have invented certain new and useful Improvements in Shears, described in the following specification and illustrated in the accompanying drawings, that form part of the same.

The principal objects of the invention are to eliminate the laborious element of stooping in trimming the edges of lawns and to provide a form of shears which may be very easily operated from a standing position.

The principal feature of the invention consists in the novel construction of the shears whereby the handle portions extend substantially at right angles from the blades, one of which is rigidly connected to one handle member and the other handle member is pivotally supported and operatively connected with the other blade by a swivel connection.

In the drawings Figure 1 is a perspective view of a pair of shears constructed in accordance with this invention.

Fig. 2 is an enlarged perspective detail of the blade holding castings and pivot handle connection.

Referring to the drawings the handle 1 has rigidly secured to its lower end a member 2 which is preferably formed of cast metal having the lower end 3 thereof extending at an angle slightly greater than a right angle. This lower portion is of a plate form and at one side is provided with a projecting arm 4, which arm is formed with a longitudinal groove 5 on its inner side adapted to receive a steel blade 6 which is riveted securely thereto.

A bolt 7 is secured in the plate 3 and forms the pivot for an arm 8 which rests upon the top of the plate portion 3. The arm 8 extends outwardly in a shape corresponding with that of the arm 4, the extension end 9 having securely riveted to it the steel blade 10.

At the inner end of the arm 8 there is formed a boss 11 which is recessed to form a hemispherical socket.

A link member 12 is formed with ball-shaped ends 13 and 14 one of which rests in the socket in the boss 11 and is secured in place by a cap 15, which in Fig. 2 is shown raised above the boss. This cap is secured in place by a suitable bolt or screw extending through a lug on the cap into a suitable hole in the boss at one side of the socket.

A handle member 16 has secured to its lower end a metal extension 17 which is of bifurcated formation and extends each side of the handle 1 and is pivotally secured to the handle 1 by a bolt 18 passing therethrough.

The lower end of the extension 17 is in the form of an arm 19 and at the lower end of this arm is formed a ball socket member 20 provided with a cap 21 which is adapted to be secured upon the outer ball end of the link 10. This ball and link connection between the handle 16 and arm 8 allows the arm 8 to swing upon its pivot upon the bolt 7 and the handle 16 to swing upon its pivot on the bolt 18 with perfect freedom but forming a positive operating connection between the two, the link swiveling in its ball bearings at each end.

Each of the handle members 1 and 16 is provided with a hand grip 22 preferably arranged to extend from said handles at an angle slightly greater than a right angle and to be substantially parallel with the blades 6 and 10.

A pair of shears such as described may be operated with very great ease and with a natural movement as the handle members 1 and 16 pivot on the bolt 18 and the blades of the shears are pivoted independently at the proper point of operation.

The parts are extremely simple in construction and cheap to manufacture and a very efficient tool is provided.

What I claim as my invention is:—

1. In a pair of shears, a blade having an upturned lug at the butt end, a handle rigidly secured to said lug, an arm pivotally secured intermediate of its length to the aforesaid handle and having its lower end arranged to swing above said rigid blade, a blade pivotally mounted intermediate of its length on the upper side of the rigid blade, and a link having a universal joint connection at each end and connecting the butt end of the upper blade with the lower end of the swinging arm.

2. In a pair of shears, a blade having an upturned portion, a blade pivotally mounted on the aforesaid blade and having a spherical socket, a link having a spherical end secured in said socket, and a spherical outer end, a handle rigidly secured to the upturned portion of said blade, an arm having a spherical socket embracing the spherical outer end of said link, said arm being pivotally connected to said handle and extending thereacross, and a handle secured to the upper end of said pivotal arm.

3. A pair of shears, comprising, a member formed of cast metal having an upwardly extending handle socket and an outwardly extending arm slotted longitudinally, a blade secured in said slotted arm, an arm of cast metal slotted longitudinally and pivotally mounted on the aforesaid arm and having a boss on its inner end formed with a spherical socket, a blade secured in the latter arm, a link having a ball end secured in said spherical socket, a handle secured to the handle socket, an arm pivotally mounted on said handle and having a downward extension formed with a spherical socket engaging the outer end of said link, and a handle secured to the upper end of said pivotal arm.

CALEB ROACH.